United States Patent
El-Gabry et al.

(10) Patent No.: US 6,956,313 B2
(45) Date of Patent: Oct. 18, 2005

(54) METHOD AND APPARATUS FOR REDUCING HOT SPOT TEMPERATURES ON STACKED FIELD WINDINGS

(75) Inventors: Lamyaa Abdel-Alle El-Gabry, Niskayuna, NY (US); Steven William Jones, Delanson, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/707,911

(22) Filed: Jan. 23, 2004

(65) Prior Publication Data

US 2005/0162032 A1   Jul. 28, 2005

(51) Int. Cl.[7] .............................................. H02K 3/00
(52) U.S. Cl. ...................................... 310/179; 310/195
(58) Field of Search ................................ 310/179, 195, 310/200, 201, 208, 214; H02K 3/12, 3/48

(56) References Cited

U.S. PATENT DOCUMENTS

| | | | |
|---|---|---|---|
| 1,799,021 A | * | 3/1931 | Jessel et al. ................. 310/208 |
| 2,085,099 A | * | 6/1937 | Jones ........................... 310/225 |
| 2,333,575 A | * | 11/1943 | Kilgore et al. ................ 318/84 |
| 5,886,434 A | | 3/1999 | Nygard ......................... 310/61 |
| 5,986,380 A | | 11/1999 | Kaminski .................... 310/270 |

\* cited by examiner

*Primary Examiner*—Darren Schuberg
*Assistant Examiner*—Nguyen N. Hanh
(74) *Attorney, Agent, or Firm*—Cantor Colburn LLP

(57) ABSTRACT

A method and apparatus for a generator coil includes a plurality of stacked windings in a rotor where individual turns are stacked in parallel sided radial slots in the rotor. Each successive turn has the same width substantially corresponding to a constant width of each slot, wherein a first turn has a first thickness and a second turn has a second thickness thicker than said first thickness. The second turn is employed in regions of high temperature thereby reducing the temperature thereof.

17 Claims, 5 Drawing Sheets

METHOD AND APPARATUS FOR REDUCING HOT SPOT TEMPERATURES ON STACKED FIELD WINDINGS

BACKGROUND OF THE INVENTION

This invention relates generally to generator field windings and, more specifically, to generator field windings configured and disposed on a generator rotor in a manner to reduce hot spot temperatures.

Generator rotors are provided with radial slots about the periphery thereof, for receiving field or rotor windings of coils made up of a number of turns in a radially stacked arrangement, each turn or winding separated by insulation. The windings are retained in the slots by full-length wedges, with creepage blocks interposed between the wedges and the windings.

Generators currently available from the assignee of the present application are placed in three major design classifications based on the cooling medium used: air cooled, hydrogen cooled and liquid cooled. All hydrogen and water cooled generators use direct conductor cooling of the rotor winding for heat removal. Smaller two-pole and all four-pole generators use a radial flow design where hydrogen enters the windings through full length sub-slots and is discharged along the length of the rotor body through radial slots, machined or punched in the copper windings. The hydrogen passes from the conductors through the creepage blocks and wedges to an "air gap" between the rotor and the stator, where it is directed through the stator core to the hydrogen coolers.

At higher generator ratings, and consequently longer rotor body lengths, a gap-pickup diagonal-flow cooling process is employed. In this scheme, cold hydrogen is scooped up in the air gap between the rotor and stator and driven diagonally inwardly through the rotor field turns to directly remove the heat. At the bottom of the slot, hydrogen gas is turned and passes diagonally outwardly through the field turns to the air gap in a discharge stator core section. The stator core ventilation is coordinated with the rotor cooling gas flow, thus creating an in and out flow of hydrogen through the stator core, through the rotor and returning to the hydrogen cooler through the core.

The generator field windings consist of extruded copper that is drawn at a copper mill and then machined and fabricated into a usable coil. Within the last few years, these coils have been redesigned from square corner fabricated coils, to a "C" coil. The cross section of the copper to make these coils has essentially remained the same. The "C" coil has nevertheless been preferred because many benefits have been derived from that shape relating to cost, cycle time and quality. Nevertheless, in order to maintain a competitive stance in the marketplace, new copper designs are constantly being evaluated for increased performance. With the constant design changes, the cross sectional area of the copper has been increasing. When the thickness increases, radial air cooling ducts that are machined in by a punch operation become increasingly more difficult to produce. For example, conventional punch operations may produce an unacceptable bulge in a width dimension of the copper, and it is therefore necessary to create a ventilation scheme for the increasing cross sections of the copper windings without unacceptable bulges in the width dimension.

Furthermore, a design requirement that must be met as part of the industry standards on electrical generators includes meeting specific temperature rise requirements within the capability of certain classes of insulation. One such design requirement is that the maximum field winding temperature stay below a certain limit. In many ventilated field windings, the hot spot temperature is the limiting factor in increasing power density. One method of reducing the hotspot includes increasing the ventilation flow and directing it to regions of high temperature. The disadvantage of increasing flow is that it increases the pumping and windage losses which directly reduce generator efficiency. Another method includes reducing the amount of heat generation in regions of high temperature. For example, one method of reducing the heat generation includes increasing the cross-section area of the field winding copper thereby reducing the resistance and the local heat generation.

The assignee presently makes generator fields with a tapered slot to increase copper content thereby increasing the field thermal capability. In particular, recent generators that use the tapered slot field include tapered slots with either square corner field winding designs or c-coil field winding designs. The tapered slot designs require turns of variable width as a consequence of the slot geometry and may have in the past used thicker turns at the narrow portion of the taper. Furthermore, tapered slots are more costly to machine than parallel slots and turns of variable width in a stack are more complex for manufacturers to make and assemble.

It is desired to reduce local hot spot temperatures on generator fields by reducing heat generation without utilizing variable width turns on a tapered slot design.

BRIEF DESCRIPTION OF THE INVENTION

The above discussed and other drawbacks and deficiencies are overcome or alleviated by a method and apparatus for reducing field hot spot temperatures through varying the copper turn thickness. More specifically, the concept being proposed capitalizes on the ability to reduce local hot spot temperature by reducing the local heat generation (i.e. by reducing the local resistance of the winding through increasing the copper cross-section area). Thus, in the broader aspects, the invention relates to an end turn arrangement for windings in a rotor where individual turns are stacked in parallel sided radial slots in the rotor, with successive turns having the same width in a radial inward direction, the end turns of the individual turns of each stack being aligned along both edges defining each slot, wherein the turn thickness is increased in regions of high temperature thereby reducing the temperature. An added benefit of having variable turn thickness is that it results in more uniform field temperatures which results in less thermal cycling, less fatigue, and longer part life as a result of the reduced temperature gradients between the field winding components.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DETAILED DESCRIPTION OF THE INVENTION

Figure 1:
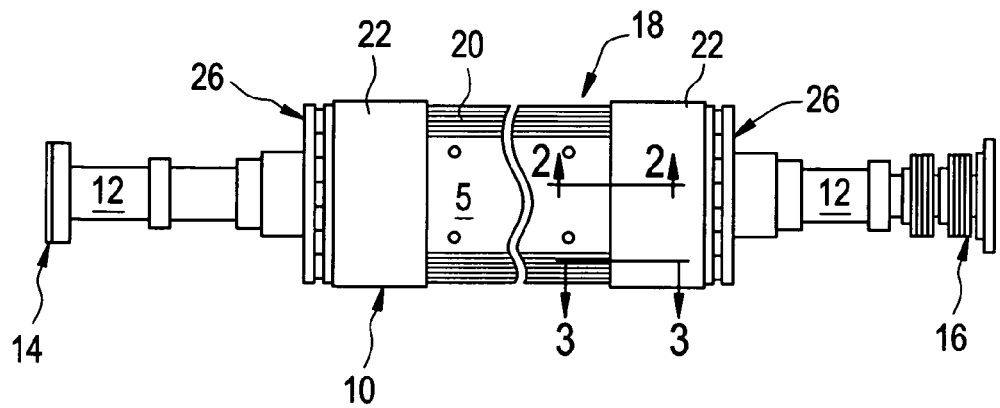
FIG. 1 is a side elevation view of a generator rotor having coil windings and retaining rings.

FIG. 1 illustrates a conventional rotor 10 for a generator (or motor). The rotor has a shaft 12 with a power turbine (or mechanical mode) coupling 14 and supported by bearings (not shown). The rotor shaft 12 also has a collector ring 16 that provides an electrical junction for the rotor field winding.

The rotor has a large diameter body 18 that holds the coil windings 20. The rotor body has longitudinally oriented slots extending radially outwardly from the center of the rotor 10, and in which the individual turns of the windings 20 are mounted. These slots extend the length of the rotor body, and annular retaining rings 22 cap both ends of the rotor body 18. The retaining rings are supported at one end by the rotor body (see FIG. 2). Adjacent the retaining rings 22 are fans 26 that cool the retaining rings and other rotor components.

Figure 2:
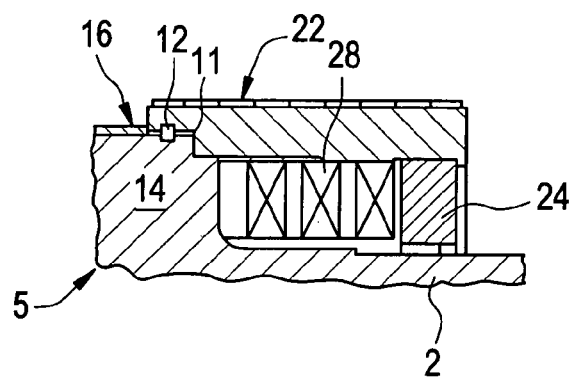
FIG. 2 is a partial axial cross section of the rotor shown in FIG. 1, illustrating a conventional coupling between a retaining ring and a rotor body taken along the line 2—2 of FIG. 1.
Figure 3:
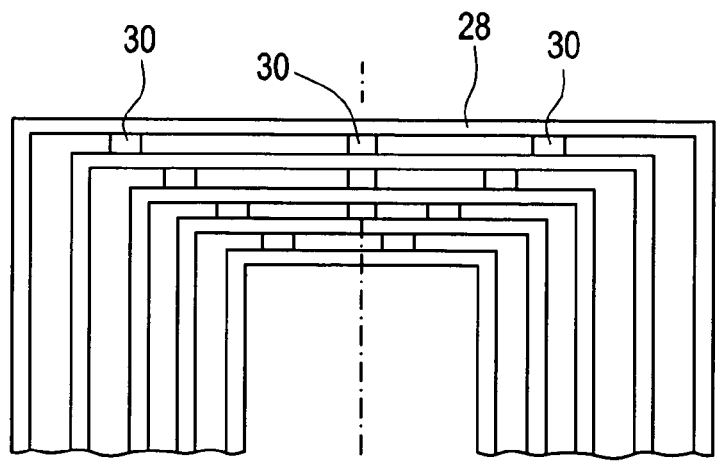
FIG. 3 is a schematic view of the end windings of a rotor, illustrating conventional blocking between adjacent end windings.

As will be appreciated from FIG. 2, the retaining rings 22 slide over the end of the rotor body 18 and are attached to the rotor body 18 by a conventional shrink fit process. The end turns 28 are enclosed by the retaining rings 22, which thus prevent radially outward movement of the end turns 28 by centrifugal forces generated by the rotor 10. The end turns 28 extend circumferentially about the rotor and are axially spaced from one another, while the turns between the ends lie parallel to the rotor axis and are circumferentially spaced from each other. In each case, the spacing between adjacent coils is maintained by a predetermined distance by means of blocks 30 as shown in FIG. 3.

Figure 4:
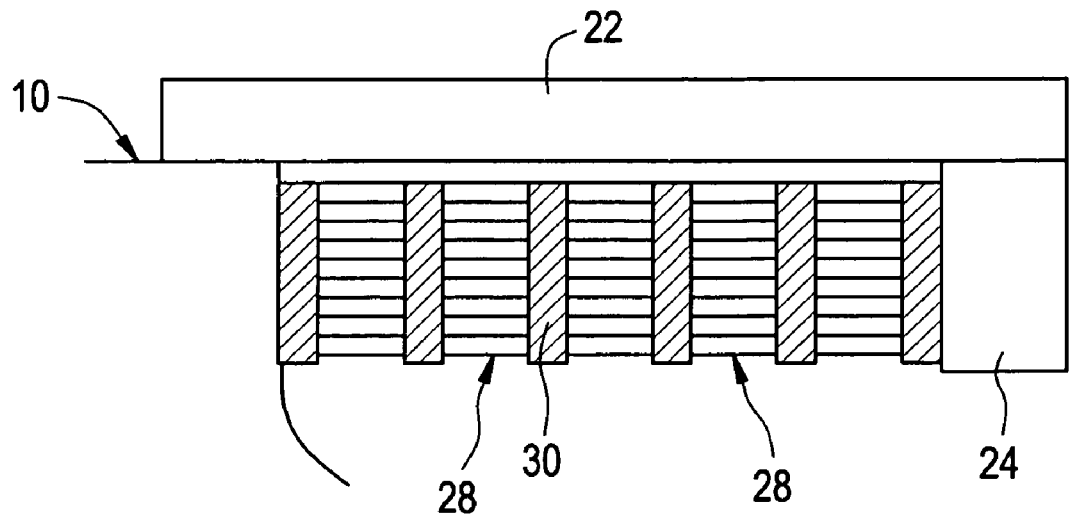
FIG. 4 is a schematic axial section of the end windings of a rotor having parallel slots.
Figure 5:
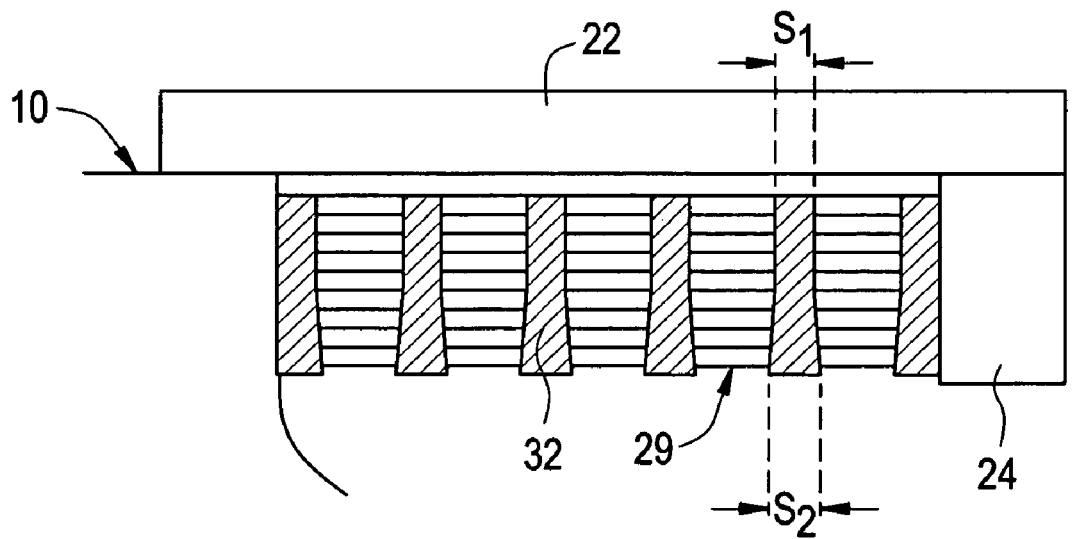
FIG. 5 is a schematic view similar to FIG. 4, but illustrating end windings for rotors with centered taper slots.
Figure 6:
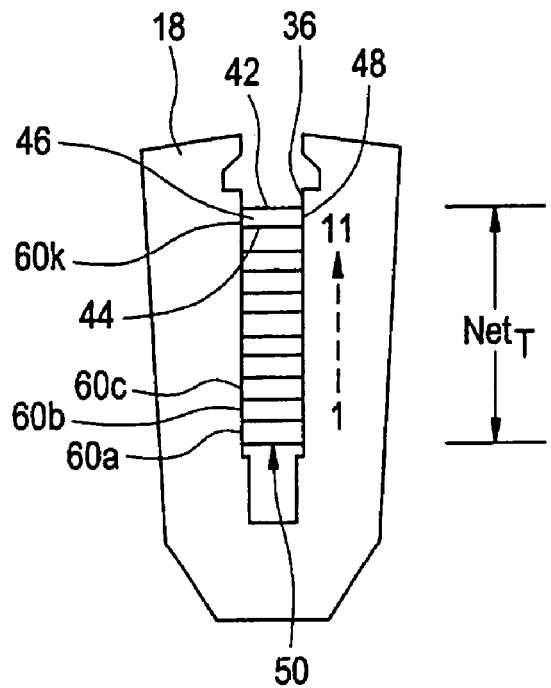
FIG. 6 is a schematic diagram of eleven constant thickness turns in a parallel sided generator rotor slot.

In FIG. 4, the spacer blocks 30 are shown at axially spaced locations between the end turns of the windings 28 of the coils. Note that the end turns are vertically aligned with parallel sides, typical of rotor configurations which employ parallel sided slots. The individual turns as they appear in the parallel sided slots of the rotor are shown in FIG. 6. For rotors which have tapered slots, however, the end turns 29 typically appear as shown in FIG. 5. Spacer blocks 32 are shown at axially spaced locations between end turns of the windings 29 of the coils.

FIG. 6 illustrates a conventional field winding copper construction wound on rotor body 18 having parallel sided slots 36, wherein the extruded copper has a substantially rectangular cross-sectional shape, including an upper side 42, a lower side 44 and opposite side edges 46 and 48. In conventional systems, the slot contains layers of copper turns separated by layers of turn insulation. The extruded copper is optionally subjected to a punching process in order to provide a plurality of axially spaced holes along the length of the copper generally indicated at 50. When a plurality of such field windings are stacked as shown in FIG. 6 at 60a, 60b, 60c, . . . and 60k, the corresponding aligned holes 50 (e.g., 50a, 50b, 50c . . . . and 50k, respectively), form a direct radial coolant passage which, in a typical generator configuration, extends from an inner axially extending sub-slot, to the air gap between the rotor and the stator. Individual windings are separated by strips of insulation shown generally at 71 (see FIG. 7). As can be seen in FIG. 1, many such radial ducts are provided along the length of the field winding copper and, for example, can be spaced as little as two inches apart.

Figure 7:
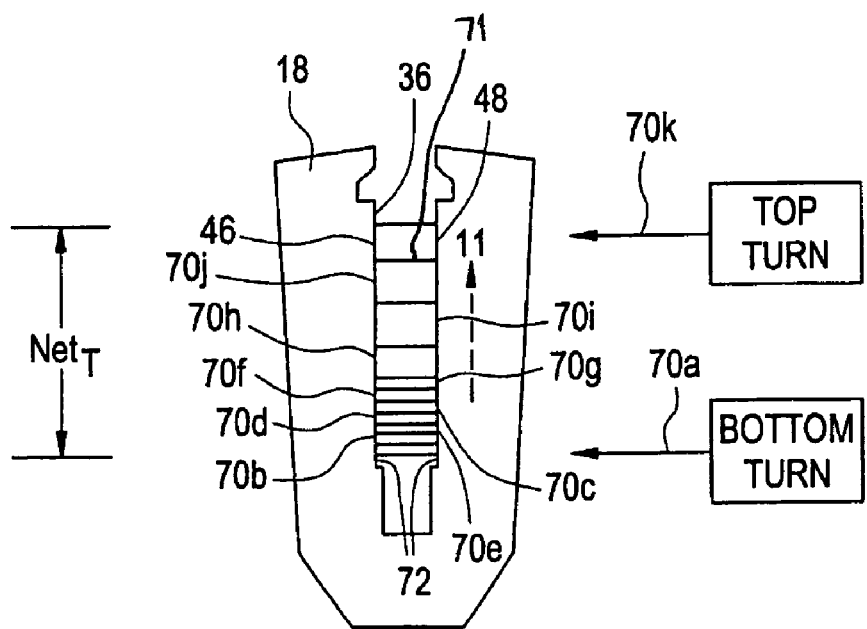
FIG. 7 is a schematic diagram similar to FIG. 6 but with eleven varying thickness turns in the parallel sided generator slot in accordance with an exemplary embodiment.

In accordance with an exemplary embodiment, the rotor body 18 is formed with parallel sided slots 36 with reference to FIG. 7. The coil construction is modified so that the eleven turns of windings 70a–70k are of varying thickness of at least two different thicknesses, but all having substantially the same width corresponding to a constant width of the parallel sided slot 36 in which the turns are disposed. It will be recognized by one skilled in the pertinent art that the slot width and the width of a field turn are not equal. There is tolerance therebetween such that an insulator, called slot armor, is disposed in the slot insulating both sides of the field winding so that the field winding is aligned with, but not in contact with sidewalls or edges defining each slot.

In other words, each opposing side edge 46, 48 of each turn 70a–70k having at least one of two different thickness as illustrated in FIG. 7 is aligned along a corresponding common edge 72 defining a constant slot width (i.e. there is no taper) of each parallel sided slot 36 for purposes of reducing hot spot temperatures, which is a different design intent than that utilizing a tapered slot. Thicker turns are disposed in regions of high temperature, for example, the top turns 70h–70k which generally exhibit higher temperatures in the class of electrical machines in which the variable turn thickness concept is contemplated (e.g., large steam-turbine generators). In this manner, the increased cross sectional area afforded by the thicker copper turns reduces the electrical resistance therethrough, and thus, local heat generation relative to using a thinner copper turn. A field winding design that utilizes more than one turn thickness to manage the heat generation reduces the localized maximum field temperature. Accordingly, replacing the layers of constant turn thickness turns (e.g., turns 60a–60k of FIG. 6) with layers of differing turn thickness, reduces local hot spot temperature by reducing the heat generation (i.e. by reducing the local resistance of the winding through increasing the copper cross-section area). Moreover, it will be recognized that increasing the copper cross-section area by replacement of the layers of constant turn thickness turns (e.g., turns 60a–60k of FIG. 6) with layers of differing turn thickness can be accomplished without increasing the number of turns and/or the net copper turn thickness ($Net_T$) of the copper turns as illustrated in FIG. 7.

Figure 8:
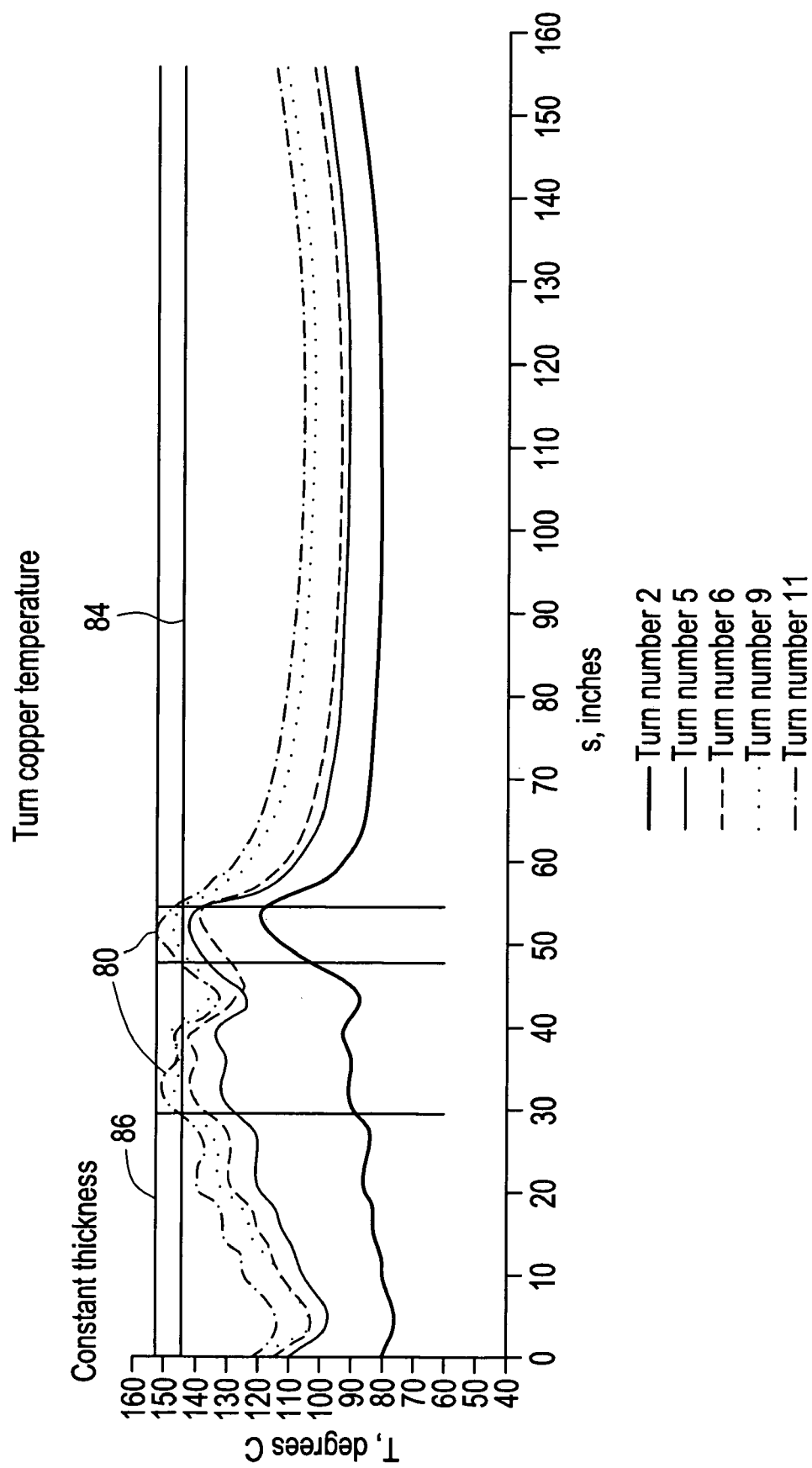
FIG. 8 is a graph illustrating the temperature vs. the length of some of the eleven constant thickness turns of FIG. 6.
Figure 9:
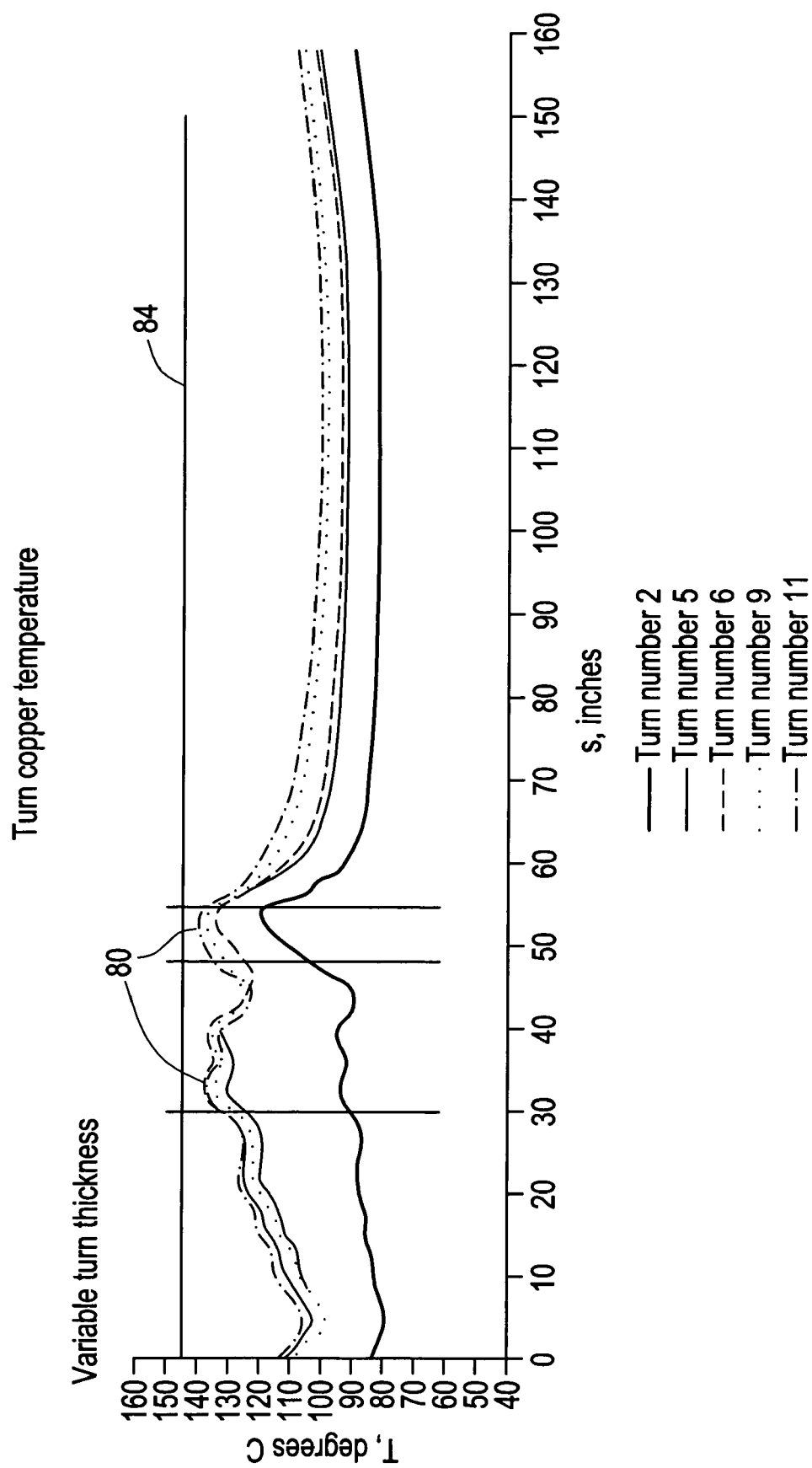
FIG. 9 is a graph illustrating the temperature vs. the length of some of the eleven varying thickness turns of FIG. 7 indicative of reduced temperatures associated with field hot spots in accordance with an exemplary embodiment.

FIGS. 8 and 9 illustrate a three-dimensional detailed thermal analysis performed with respect generator rotor 18 being wound with a constant turn thickness as in FIG. 6 and with a multiple turn thickness as in FIG. 7, representative of two concepts. The net copper thickness (Net T), number of turns, slot geometry and turn insulation thickness are identical in both cases. The only difference between the two concepts is that one concept uses eleven turns of constant thickness and the second concept uses eleven turns of two different thickness.

Still referring to FIGS. 6–9, it will be recognized by one skilled in the pertinent art that the hot spot temperature indicated by peak temperatures of the top turns or turns 9 and 11 generally shown at 80 using a two turn thickness dropped by about 7° C. from that of using a constant turn thickness. More specifically, it will be noted that the peak temperatures 80 occur along a length of turn numbers 9 and 11, for example, at about 33 inches and at about 55 inches having a peak temperature of about 146° C. indicated with line 84 in FIG. 9 and about 153° C. indicated with line 86 in FIG. 8.

It is contemplated that a further reduction of hot spot temperature is possible if the slot contained three or more turn thicknesses. For example, in an alternative embodiment, a three copper turn thickness is contemplated. Turns 8–11 optionally having a copper thickness of 0.353 inches, turns 5–7 having a copper thickness of 0.323 inches, and turns 1–4 having a copper turn thickness of 0.293 inches, all turns having a width of about 1.514 inches, can be wound in a slot having a constant rotor duct width. As discussed above, it has been shown with reference to FIGS. 8 and 9 that a minimum improvement of 7° C. is obtained using a two turn thickness instead of a constant turn thickness in a parallel sided slot, while more than a 7° C. reduction is contemplated when employing a three or more turn thickness. In turn, a variable turn thickness provides less radial variation in temperature and reduced hot spot temperature along the coil side of the generator.

By employing constant width turns of variable thickness (two or more) in a generator rotor, local heat generation is reduced in critical regions and is allowed to increase in less critical regions thereby obtaining an overall reduction in the hot spot temperature. This feature increases the entitlement on ventilated field windings thereby enabling increased power density and possibly improved efficiency. In particular, local heat generation is reduced by reducing the local resistance of the winding through increasing the copper cross-section area by increasing only the thickness while maintaining a constant width of the copper turns.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A generator coil comprising:
   a winding of a rotor where individual turns of the winding are stacked in a parallel sided radial slots in the rotor, each successive turn having the same width, wherein a first turn of the winding has a first thickness and a second turn of the winding has a second thickness thicker than said first thickness, said second turn employed in regions of high temperature thereby reducing the temperature thereof.

2. The generator coil of claim 1, wherein said second turn is employed in at least one of a region of high temperature and top turns of the rotor.

3. The generator coil of claim 1, wherein each turn comprises an axial length of copper having a generally rectangular cross-sectional shape.

4. The generator coil of claim 1, wherein said each slot contains layers of said individual turns comprising copper turns separated by layers of turn insulation.

5. The generator coil of claim 4, wherein said layers of turn insulation disposed between said first and second turns have substantially the same thickness.

6. The generator coil of claim 1, wherein a net turn thickness and number of turns are identical to that if a constant turn thickness was employed in said each slot of identical geometry.

7. The generator coil of claim 1, wherein at least two different turn thicknesses are employed.

8. The generator coil of claim 1, wherein a hot spot temperature corresponding to said region of higher temperature is reduced by about 7° C. from that of using constant turn thickness when a two turn thickness is employed in a corresponding parallel sided slot having eleven turns.

9. A dynamoelectric machine comprising:
   a rotor having a plurality of slots;
   a plurality of copper turns each having a same width and stacked in each slot of said plurality of slots, wherein a first copper turn has a first thickness and a second copper turn disposed in a same slot as the first copper turn has a second thickness thicker than said first thickness, said second copper turn is employed in regions of high temperature thereby reducing the temperature.

10. The dynamoelectric machine of claim 9, wherein each slot of said plurality of slots is configured as a parallel sided slot.

11. The dynamoelectric machine of claim 9, wherein said first and second copper turns comprises an axial length of copper having a generally rectangular cross-sectional shape.

12. The dynamoelectric machine of claim 9, wherein said second copper turn is employed in at least one of a region of high temperature and top turns of the rotor.

13. The dynamoelectric machine of claim 9, wherein said each slot contains layers of copper turns separated by layers of turn insulation.

14. The dynamoelectric machine of claim 13, wherein said layers of turn insulation disposed between said first and second copper turns have substantially the same thickness.

15. The dynamoelectric machine of claim 9, wherein a net turn thickness and number of turns are identical to that if a constant turn thickness was employed in slots of identical geometry.

16. The dynamoelectric machine of claim 9, wherein at least two different turn thicknesses are employed.

17. The dynamoelectric machine of claim 9, wherein a hot spot temperature corresponding to said region of higher temperature is reduced by about 7° C. from that of using constant turn thickness when a two turn thickness is employed in a corresponding parallel sided slot having eleven turns.

* * * * *